Dec. 15, 1925.  1,565,770
Z. ALMESAN
SHOCK ABSORBER
Filed May 29, 1924
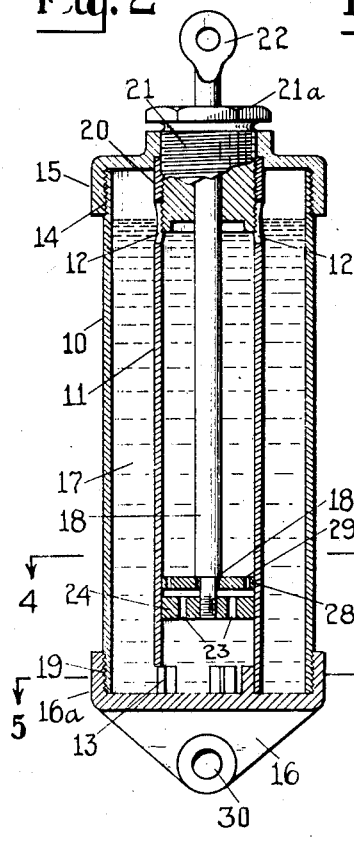
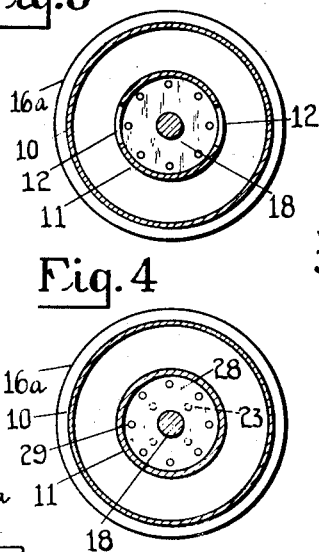
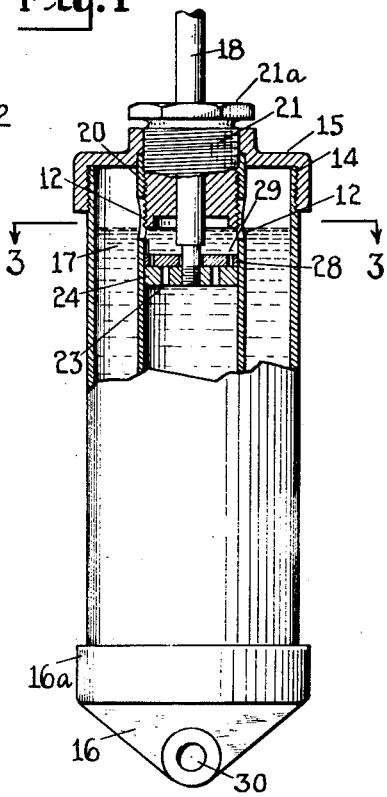
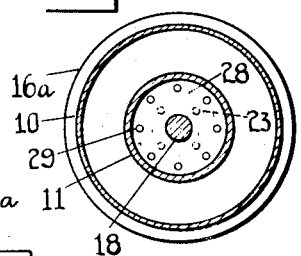
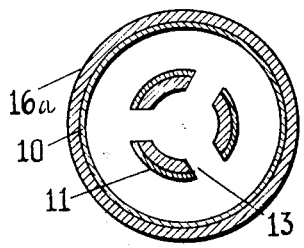
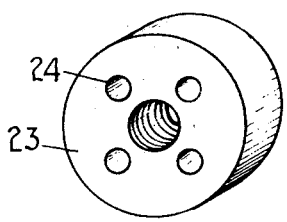
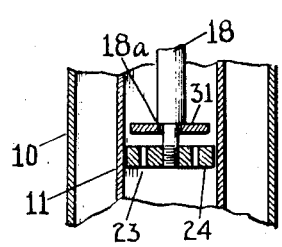
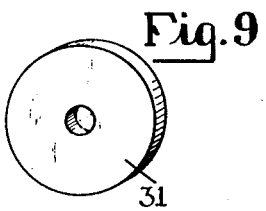
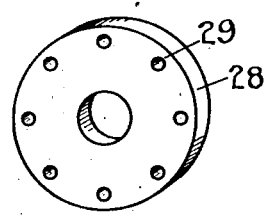
Inventor
ZARIE ALMESAN
By his Attorney Patented Dec. 15, 1925.

1,565,770

UNITED STATES PATENT OFFICE.

ZARIE ALMESAN, OF NEW YORK, N. Y.

SHOCK ABSORBER.

Application filed May 29, 1924. Serial No. 716,589.

*To all whom it may concern:*

Be it known that ZARIE ALMESAN, citizen of the United States, residing at New York city, in the county of Bronx and State of New York, has invented certain new and useful Improvements in Shock Absorbers, of which the following is a specification.

This invention relates to shock absorbers for automobiles and the like.
Among the objects thereof is to provide a practical device of the character described, constructed of inexpensive and simple parts that may be readily manufactured and assembled and efficient in operation to a high degree.

Other objects of this invention will in part be obvious and in part hereinafter pointed out.

Certain features shown and described herein but claimed in my co-pending application Ser. No. 691,107, filed Feb. 7, 1924, are not herein claimed.

With the above exception, the invention accordingly consists in the features of construction, combinations of elements and arrangement of parts which will be exemplified in the construction hereinafter described and of which the scope of application will be indicated in the following claims.
In the accompanying drawing, in which is shown one of the various possible illustrative embodiments of this invention, Fig. 1 is a view in side elevation, partly in section of a shock absorber embodying the invention showing the relative position of the piston parts during an upward stroke;

Fig. 2 is a longitudinal cross-sectional view of the shock absorber showing the relative position of the piston parts during the downward stroke;

Fig. 3 is an enlarged cross-sectional view taken on line 3—3 of Fig. 1;

Figs. 4 and 5 are enlarged cross-sectional views taken on lines 4—4 and 5—5 of Fig. 2 respectively;

Figs. 6 and 7 are perspective views of the piston head and valve closure disc shown in Figs. 1 and 2 respectively;
Fig. 8 is a fragmentary view of the shock absorber showing a modified form of valve closure disc for the port opening in the piston head; and Fig. 9 is a perspective view of the modi- fied form of the closure disc shown in Fig. 8.

Referring in detail to the drawing, 10 and 11 indicate a pair of concentric cylinders, the inner cylinder 11 communicating with the outer cylinder 10 at the top and bottom by means of openings 12 and 13 respectively. The outer cylinder 10 is threaded at the top as at 14 for a screw cap member 15, and is likewise threaded at the bottom as at 19 for an attaching member 16. The cylinders are filled with a suitable liquid 17, such as oil, and operating within the inner cylinder 11 is a piston comprising a piston-rod 18 on which is secured a piston-head 24. The inner cylinder 11 is threaded at its upper end as at 20 for a screw regulating cap 21, and the piston-rod 18 extends through said cap 21, the latter being bored centrally so as to permit free movement of the piston.

The screw cap 21 may be adjusted so as to control the size of the orifice openings 12, thus making it possible to regulate the effective resistance of the device to the recoil when in use, and for this purpose a polygonal head 21ª may be provided by means of which member 21 may be screwed in and out of the inner cylinder 11 as shown in Figs. 1 and 2.

Secured to the top of the piston, preferably formed integral therewith, is a ring member 22 whereby the piston may be attached to the side bar or chassis of a vehicle in the well known manner.

In combination with the piston head 24 is provided a hydraulic valve comprising valve ports 23 formed through the said head 24, and a closure disc or plate 28 therefor. The disc 28 has perforated openings 29 therein and is loosely mounted for turning and limited movement along a reduced shouldered portion 18ª formed on the piston rod 18 as shown in Figs. 1 and 2. The disc 28 normally covers ports 23 and the perforated openings 29 therein are positioned so that they cannot register with the ports 23. Disc 28 as shown in Figs. 1, 2, 4 and 7, may be substantially of the same diameter as the piston-head 24, and may be guided between the portion 18ª and the interior side of the cylinder 11.

The shock absorber may be attached to a vehicle as shown in my said co-pending application, with the piston rod 18 swivelly connected to the chassis by means of ring member 22. The lower portion of the shock absorber is secured to the rear axle by means of the attaching member 16, having cap portions 16ᵃ. The latter is secured to the bottom of the outer cylinder as shown in Fig. 2 and serves as a closure for the two cylinders, and also provides a journal member 30.

The operation of the shock absorber is as follows: When the vehicle spring attached to the shock absorber is compressed, the piston is lowered and during the downward movement thereof, the oil is forced through ports 23 of the piston head 24, urging the disc 28 upward along the rod 18 away from the piston head 24 as shown in Fig. 2. The oil under the piston head 24 then passes between the piston head 24 and disc 28, and through openings 29 to the upper portion of the inner cylinders 11. Due to the downward movement of the piston, there also is a tendency for some of the oil to flow through upper opening 12 and some through the lower opening 13 to the outer cylinder 10, these tendencies being in opposite directions.

On the rebound of the spring, the piston will be drawn upward, immediately causing the disc 28 to be seated against the piston head 24, thus tightly closing ports 23 as shown in Fig. 1, and since the openings 28 do not register with said ports 23, all the oil above the piston offers resistance to the upward movement thereof, said oil being slowly forced through upper opening 12 into the outer cylinder 10 and from the outer cylinder 10 through the lower opening 13 to the inner cylinder 11.

Under the above described conditions, there is a flow or circulation of oil between the outer and inner cylinders during the downward and upward movement of the piston corresponding with the usual relative movements of the chassis, axle and spring of an automobile. This circulation or flow acts as an efficient and responsive cushion to take up almost instantly the violent return movement immediately it is transmitted to the spring, thereby preventing the undesirable shock that otherwise would result.

In Figs. 8 and 9 is shown a modified form of closure disc 31 having no perforations therein but which allows the passage of the oil around the outer edge thereof permitting practically the same operation as with the disc 28 described above.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:—

1. A shock absorber comprising an outer cylinder, an inner cylinder, the latter communicating adjacent the top and bottom with said outer cylinder, a liquid in said cylinders and a piston including a piston rod and a piston head operating within the inner cylinder to cause a flow of liquid from the inner cylinder into the outer cylinder upon an upward movement of the piston, said piston head having a port opening therethrough, and a disc mounted on said rod and movable with respect to the piston head to permit the passage of the liquid through said port opening on a downward movement of the piston, and to entirely close the openings against the flow of liquid therethrough on the upward movement of the piston.

2. A shock absorber comprising an outer cylinder, an inner cylinder, the latter communicating adjacent the top and bottom with said outer cylinder, a liquid in said cylinders and a piston including a piston rod and a piston head operating within the inner cylinder for causing a flow of liquid from the inner cylinder into the outer cylinder upon an upward movement of the piston, said piston head having a port opening therethrough, and a disc mounted for turning on and for movement lengthwise of said rod to permit the passage of the liquid through said port opening on a downward movement of the piston, and to entirely close the openings against the flow of liquid therethrough on the upward movement of the piston.

3. A shock absorber comprising an outer cylinder, an inner cylinder, the latter communicating adjacent the top and bottom with said outer cylinder, a liquid in said cylinders and a piston including a piston rod and a piston head operating within the inner cylinder for causing a flow of liquid from the inner cylinder into the outer cylinder upon an upward movement of the piston, said piston head having a port opening therethrough, a disc being mounted for turning on and for movement lengthwise of said rod to permit the passage of a liquid through said port opening on a downward movement of the piston, and to entirely close the openings against the flow of liquid therethrough on the upward movement of the piston, and means for limiting the longitudinal movement of said disc.

4. A shock absorber comprising an outer cylinder, an inner cylinder, the latter communicating adjacent the top and bottom with said outer cylinder, a liquid in said cylinder and a piston including a piston rod and a piston head operating within the inner cylinder for causing a flow of liquid from the inner cylinder into the outer cylinder upon an upward movement of the piston, said piston head having a port opening therethrough, a disc of substantially the same diameter as the said head having an opening therethrough and mounted for turning on and for movement lengthwise of the rod to permit passage of the liquid through said port opening on a downward movement of the piston, and to entirely close the openings against the flow of liquid therethrough on the upward movement of the piston, said opening being incapable of being positioned to register with said port openings.

5. A shock absorber comprising an outer cylinder, an inner cylinder, the latter communicating adjacent the top and bottom with said outer cylinder, a liquid in said cylinder and a piston including a piston rod and a piston head operating within the inner cylinder for causing a flow of liquid from the inner cylinder into the outer cylinder upon an upward movement of the piston, said piston head having a port opening therethrough, a disc of substantially the same diameter as the said head having an opening therethrough and mounted for turning on and for movement lengthwise of the rod to permit passage of the liquid through said port opening on a downward movement of the piston, and to entirely close the openings against the flow of liquid therethrough on the upward movement of the piston, said opening being incapable of being positioned to register with said port openings, and means to limit the longitudinal movement of said disc.

6. In a shock absorber having a cylinder, a piston operating therein, a liquid in said cylinder, said piston including a piston rod and a piston head mounted thereon, the combination, of a hydraulic valve forming part of said piston comprising a port opening through said head and a disc of substantially the same diameter as the said head having a perforated opening therethrough, mounted to turn on and to move lengthwise of said rod for permitting passage of the liquid through said opening on movement of the piston in one direction only, said opening being incapable of being positioned to register with said port opening.

7. In a shock absorber having a cylinder, a piston operating therein, a liquid in said cylinder, said piston including a piston rod and a piston head mounted thereon, the combination of a hydraulic valve forming part of said piston comprising a port opening through said head and a disc of substantially the same diameter as the said head having a perforated opening therethrough, mounted to turn on and to move lengthwise of said rod for permitting passage of the liquid through said opening on movement of the piston in one direction only, said opening being incapable of being positioned to register with said port opening, and means to limit the longitudinal movement of said disc.

8. In a shock absorber having a cylinder, a piston operating therein, a hydraulic valve forming part of said piston comprising a piston head having a port opening therethrough, and a disc having an opening therein normally closing the entire port opening, said disc being movable with respect to the said head and adapted to permit passage of a liquid through the said openings on movement of the piston in one direction only, said perforated opening being incapable of being positioned to correspond with said port opening.

In testimony whereof I affix my signature.

ZARIE ALMESAN.